(12) United States Patent
Mühlberger et al.

(10) Patent No.: US 12,366,262 B2
(45) Date of Patent: Jul. 22, 2025

(54) UNDERWATER HOOK WITH ACTUATION BUTTON AND RELEASE BUTTON

(71) Applicant: RUD KETTEN RIEGER & DIETZ GMBH U. CO. KG, Aalen (DE)

(72) Inventors: Lukas Mühlberger, Bopfingen (DE); Michael Betzler, Abtsgmünd (DE)

(73) Assignee: RUD KETTEN RIEGER & DIETZ GmbH u. Co. KG, Aalen (DE)

( * ) Notice: Subject to any disclaimer, the term of this patent is extended or adjusted under 35 U.S.C. 154(b) by 684 days.

(21) Appl. No.: 17/637,963

(22) PCT Filed: Aug. 28, 2020

(86) PCT No.: PCT/EP2020/074144
§ 371 (c)(1),
(2) Date: Feb. 24, 2022

(87) PCT Pub. No.: WO2021/038083
PCT Pub. Date: Mar. 4, 2021

(65) Prior Publication Data
US 2022/0275825 A1 Sep. 1, 2022

(30) Foreign Application Priority Data
Aug. 30, 2019 (DE) ...................... 10 2019 213 151.4

(51) Int. Cl.
*F16B 45/02* (2006.01)
*B66C 1/36* (2006.01)

(52) U.S. Cl.
CPC .............. *F16B 45/026* (2021.05); *B66C 1/36* (2013.01); *F16B 45/027* (2021.05); *F16B 45/028* (2021.05)

(58) Field of Classification Search
CPC ........ B66C 1/36; F16B 45/023; F16B 45/027; F16B 45/028; F16B 45/029
(Continued)

(56) References Cited

U.S. PATENT DOCUMENTS

| 1,626,865 A | 5/1927 | Neilson |
| 1,740,782 A * | 12/1929 | Ratigan ................. F16B 45/045 |
| | | 294/82.23 |

(Continued)

FOREIGN PATENT DOCUMENTS

| DE | 202011103255 U1 | 12/2011 |
| DE | 102010027153 A1 | 1/2012 |

(Continued)

OTHER PUBLICATIONS

German Search Report (GSR) of corresponding German patent application No. 10 2019 213 151.4 dated Aug. 5, 2020, 10 pages.

(Continued)

*Primary Examiner* — Stephen A Vu
(74) *Attorney, Agent, or Firm* — Edell, Shapiro & Finnan, LLC

(57) ABSTRACT

Disclosed is an underwater hook comprising a jaw latch, which, in a secured condition of the underwater hook, is releasably secured in a position closing a hook jaw. The underwater hook additionally comprises an actuation button which, for opening the jaw latch, is connected to the jaw latch in a motion-transmitting manner and occupies a closed position in the secured condition of the underwater hook. Furthermore, the underwater hook is provided with a release button blocking a movement of the actuation button away from the closed position in the secured condition of the underwater hook. In order to allow the release button to be actuated without great effort, even in the case of great forces acting on the jaw latch, the present invention provides that the release button is in engagement with the actuation button in the secured condition of the underwater hook.

20 Claims, 5 Drawing Sheets

Figure 1:
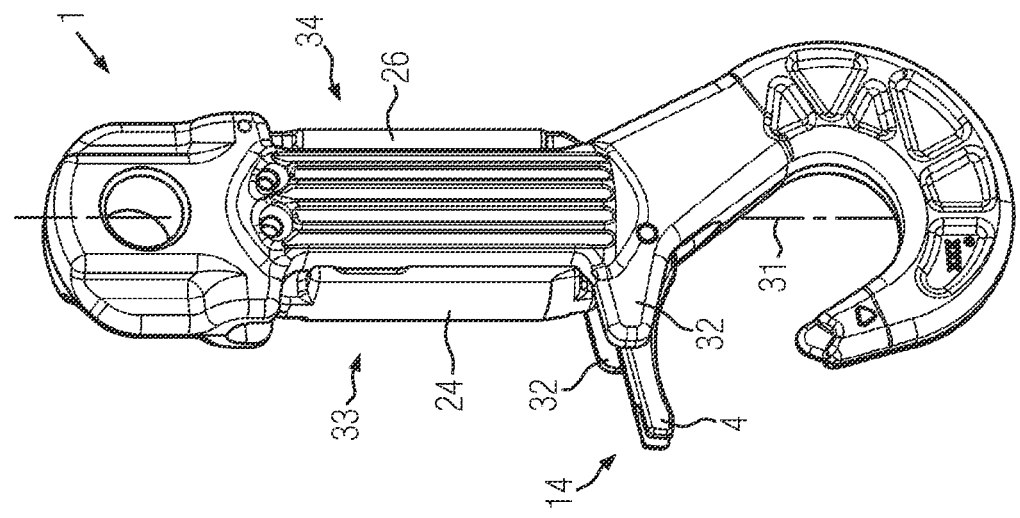

(58) Field of Classification Search
USPC ........... 294/82.19, 82.2, 82.21, 82.23, 82.24, 294/82.27
See application file for complete search history.

(56) References Cited

U.S. PATENT DOCUMENTS

| | | | | |
|---|---|---|---|---|
| 3,109,676 | A * | 11/1963 | Mercer | B66C 1/38 294/82.27 |
| 4,358,146 | A * | 11/1982 | Goudey | B63B 23/58 294/82.27 |
| 4,977,647 | A * | 12/1990 | Casebolt | F16B 45/028 24/599.5 |
| 5,257,441 | A * | 11/1993 | Barlow | F16B 45/034 24/600.1 |
| 6,898,829 | B2 * | 5/2005 | Loe | F16B 45/028 24/600.1 |
| 8,544,155 | B2 * | 10/2013 | Lin | F16B 45/026 24/600.1 |
| 2011/0175385 | A1 | 7/2011 | Buie et al. | |
| 2017/0241470 | A1 | 8/2017 | Vaccari | |

FOREIGN PATENT DOCUMENTS

| | | |
|---|---|---|
| DE | 102016215631 A1 | 2/2018 |
| JP | S498662 U | 1/1974 |
| JP | S526964 U | 1/1977 |
| JP | S5213249 U | 1/1977 |
| TW | I664357 B | 7/2019 |
| WO | 0225123 A1 | 3/2002 |

OTHER PUBLICATIONS

Taiwanese Office Action of corresponding Taiwanese patent application No. TW 109129742 A with English translation dated May 28, 2021, 11 pages.
International Search Report for International Application No. PCT/EP2020/074144 dated Dec. 9, 2020, 4 pages.
Examination Report No. 1 for Australian Patent Application No. 2020338819 dated May 27, 2023, 6 pages.

* cited by examiner

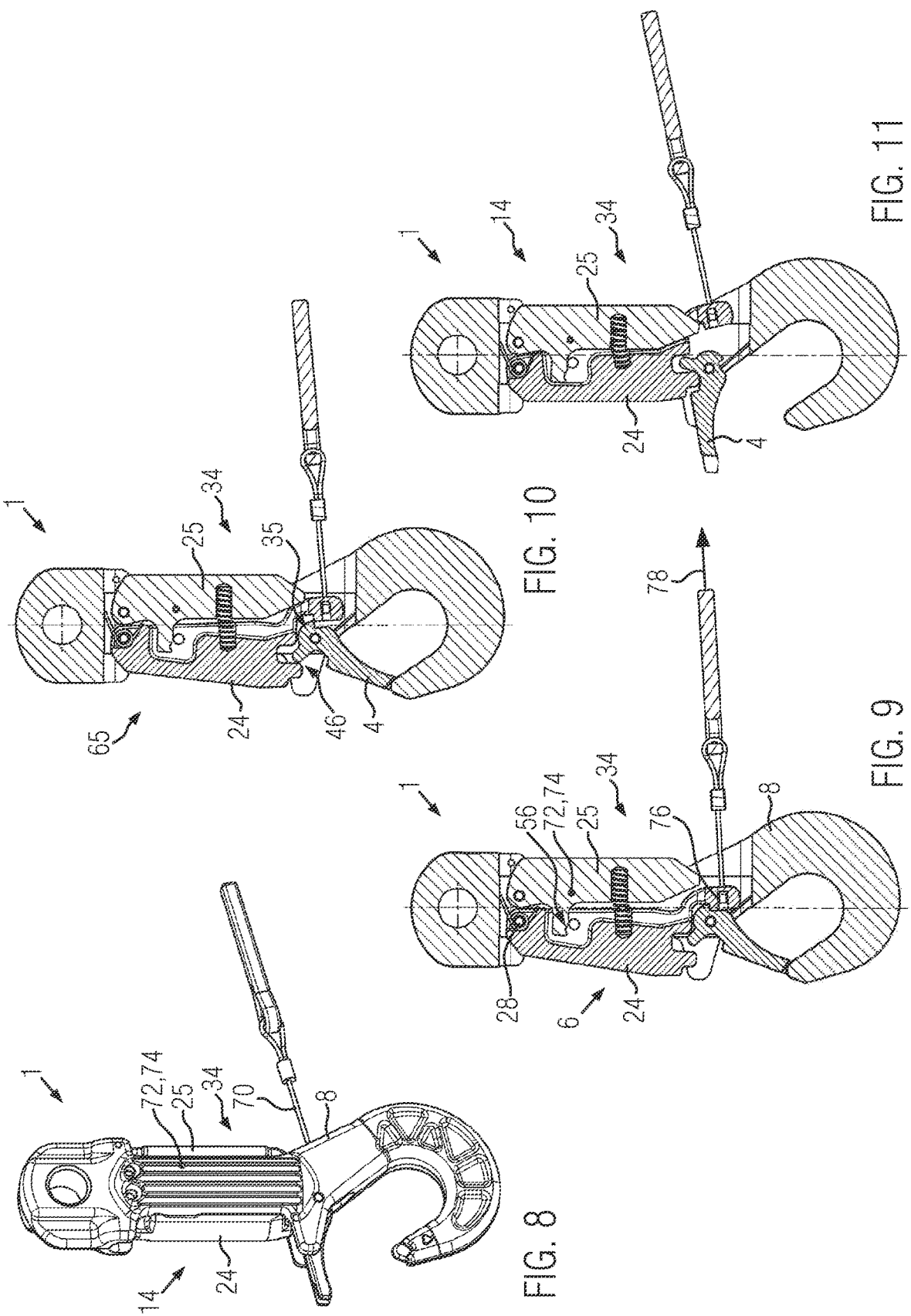

UNDERWATER HOOK WITH ACTUATION BUTTON AND RELEASE BUTTON

The present invention relates to an underwater hook comprising a jaw latch which, in a secured condition of the underwater hook, is releasably secured in a position closing a hook jaw, an actuation button which, for opening the jaw latch, is connected to the jaw latch in a motion-transmitting manner and occupies a closed position in the secured condition of the underwater hook, and a release button blocking, at a locking position, a movement of the actuation button away from the closed position in the secured condition of the underwater hook.

This kind of underwater hook is known from WO 2/25123 A1. However, this hook is disadvantageous insofar as the release button is difficult to actuate, when a load presses on the jaw latch in the opening direction of the latter.

It is therefore the object of the present invention to provide an underwater hook that can be operated more easily and more reliably.

According to the present invention, this object is achieved in that the release button is in engagement, in particular in direct engagement, with the actuation button in the secured condition of the underwater hook.

This embodiment prevents a load acting on the jaw latch from impairing the actuation of the release button.

The present invention can be improved by the additional further developments, each of which is advantageous in itself and can be combined with the other further developments in an arbitrary manner.

According to a first advantageous embodiment, for example, the actuation button may have an open position spaced apart from the closed position. In the closed position of the actuation button, the hook jaw is closed by the jaw latch coupled to the actuation button, in the open position the jaw latch is open. In order to allow the underwater hook to be actuated by a gripper of an underwater vehicle, it will be advantageous when the actuation button is pushed-in in the open position compared to the closed position. Due to the motion-transmitting coupling of the actuation button and the jaw latch, the movement of the actuation button from the closed position to the open position can be transmitted into a corresponding movement of the jaw latch from a position in which it closes the hook jaw to a position in which the hook jaw is open.

The closed position of the actuation button, in which the hook jaw is closed by the jaw latch, may comprise a safety position and a release position spaced apart therefrom. Also in this case, the actuation button may be pushed-in in the release position compared to the safety position. In the safety position, the jaw latch is blocked by the actuation button against a movement in the opening direction. Hence, an opening force acting on the jaw latch in the opening direction will not be able to open the jaw latch. In the release position, the blocking of the jaw latch by the actuation button is released. An opening force acting on the jaw latch will be able to generate a force acting on the actuation button in a direction from the release position to the open position and to move the actuation button towards the open position. The safety position between the locking position and the release position increases the safety because a certain movement stroke on the part of the actuation button will first be necessary before the jaw latch will be released. In the secured condition of the underwater hook, the actuation button preferably occupies the safety position.

According to a further advantageous embodiment, the release button has a locking position and an actuation position spaced apart therefrom. In the actuation position, the release button is pushed-in compared to the locking position. In the locking position of the release button, the movement of the actuation button to the open position and away from the closed position and/or the safety position is blocked by the release button. In the secured condition of the underwater hook, the release button preferably occupies the locking position. Preferably, the underwater hook can only assume the secured condition when the release button occupies the locking position. It follows that the locking position can serve as a visible indicator indicating that the underwater hook is secured.

In the actuation position of the release button, the movement of the actuation button to the open position and away from the closed position and/or the safety position is released by the release button. It follows that, in the case of this embodiment, an actuation of the actuation button will only be possible when the release button occupies the actuation position. In the locking position, the release button blocks the actuation button. The actuation button, in turn, blocks the jaw latch. There is preferably no direct interaction between the release button and the actuation button.

The movement of the actuation button from the closed position to the open position is preferably directed towards the release button. The movement of the release button from the locking position to the actuation position is preferably directed towards the actuation button. In this way, the release button and the actuation button can be actuated by a pincer grip, this kind of grip being carried out e.g. by a gripper. For this purpose, the release button and the actuation button may in particular be located opposite each other.

Preferably, the safety position is the position of rest of the actuation button. The locking position is preferably the position of rest of the release button. The respective position of rest will in particular be assumed automatically, when no force acts on the underwater hook from outside. This ensures that, when at rest, the underwater hook will be in the secured condition.

In particular, the actuation button may be pretensioned towards the safety position. The release button may be pretensioned towards the locking position.

The underwater hook may include a main body, on which the actuation button and/or the release button are movably held. The main body forms, preferably monolithically, a hook portion bent around the hook jaw. In addition, the main body may form an attachment portion to which an attachment means can be fastened, so as to attach the underwater hook to a lifting means, by way of example. The actuation button and the release button may be arranged in an accommodation shaft formed by two jaws of the main body.

The actuation button and the release button may be movably held on the main body rotationally, e.g. pivotably, translationally, e.g. displaceably, or translationally-rotationally, e.g. via a guide link. Preferably, the actuation button and the release button are held pivotably on the main body. The pivot axles of the actuation button and of the release button are here preferably located either both on a side of the main body facing away from the hook portion or on a side of the main body facing the attachment portion, in the area between the attachment portion and the hook portion.

Motion transmission between the actuation button and the jaw latch may take place via a gear unit that interconnects the actuation button and the jaw latch. In particular, the actuation button and the jaw latch may be intermeshed. The actuation button and the jaw latch may e.g. be configured as toothed levers.

In order to cause the actuation button and the release button to automatically assume their respective position of rest, the underwater hook may have a spring system. The spring system may have a closing spring acting on the actuation button, in particular in the direction of the safety position of the latter. Preferably, the closing spring is supported directly between the main body and the actuation button.

The jaw latch need not necessarily be provided with a spring of its own, since, due to the motion-transmitting connection with the actuation button, it will be moved together with the latter by the closing spring to a position closing the hook jaw, as soon as the actuation button moves to the closed position.

The closing spring may, in particular, be a leg spring placed around the pivot axle of the actuation button, one leg of this leg spring resting on the main body and the other leg resting on the actuation button.

Additionally or alternatively to the closing spring, the spring system may include a locking spring, which acts on the release button and pushes the same in the direction of the locking position.

Preferably, the closing spring and the locking spring are connected in series, so as to determine a precisely defined sequence of movements between the release button and the actuation button, when both are actuated simultaneously, e.g. by a pincer grip of a gripper.

Preferably, the locking spring is arranged directly between the release button and the actuation button, in particular between the release button and the actuation button when seen in the direction of movement thereof. The release button can be supported on the actuation button via the locking spring. In particular, the locking spring may force the release button and the actuation button away from each other.

In order to automatically move, in the case of a pincer grip, first the release button, in particular away from the locking position, before the actuation button moves, in particular away from the safety position, the locking spring has a spring hardness lower than that of the closing spring.

In the secured condition of the underwater hook, the release button can lock the actuation button via a button locking mechanism in the closed position, in particular in the safety position. The button locking mechanism is preferably located between the release button and the actuation button, in particular in an area between the two respective ends of the release button and the actuation button, between a pivot axle and a free end or the free ends of the two buttons. Furthermore, the button locking mechanism may be located between a pivot axle of the jaw latch and the pivot axle of the actuation button and/or release button. This embodiment ensures that the area around the hook jaw and the area around the attachment portion can be kept structurally simple and compact.

The button locking mechanism is preferably a unilateral locking mechanism or directional locking mechanism, since it can preferably only be released by a movement of the release button but not by a movement of the actuation button. The button locking mechanism is locked in a safety position of the actuation button and in the locking position of the release button. When the release button occupies the actuation position, the button locking mechanism is released.

The button locking mechanism may comprise two positive locking elements that are locked to each other in the secured condition of the underwater hook and/or when the actuation button occupies the safety position and the release button occupies the locking position. In order to accomplish a compact structural design, a positive locking element on the actuation button may project into a pocket of the release button or a positive locking element on the release button may project into a pocket of the actuation button. In addition, a positive locking element of the button locking mechanism may be defined by a protrusion of the actuation button and/or of the release button.

Preferably, the button locking mechanism is configured such that a force acting on the actuation button in the secured condition of the underwater hook will generate, via the button locking mechanism, a force acting on the release button and directed through the pivot axle of the release button. As a result, the release button will remain momentum-free and can always be easily actuated, irrespectively of the magnitude of a force acting on the actuation button.

Alternatively, the force transmitted from the actuation button to the release button via the button locking mechanism may also be directed past the pivot axle of the release button and generate a torque acting on the release button in the direction of the locking position. This has the effect that the secured condition will be stabilized, when a force acts on the actuation button in the direction of the open position of the latter.

A force acting on the release button in the direction of the actuation position moves the release button to the actuation position. The movement of the release button is not transmitted to the jaw latch, so that the latter will remain closed and blocked as long as the actuation button still occupies the safety position. A force acting on the hook jaw will only be able to open the hook jaw, when the actuation button has been moved to the release position.

In order to allow the release button to be moved from the locking position to the actuation position, the force of the spring system, in particular the force of the locking spring, must first be overcome. Furthermore, a, especially unilateral, detent or limit-value locking mechanism can necessitate an additional force for moving the release button away from the locking position. The detent can preferably only be overcome by a force acting on the release button. It may be configured as a directional detent and may e.g. be formed by an interlock of the positive locking elements of the button locking mechanism. In the actuation position, the interlock of the positive locking elements of the button locking mechanism is then released. The use of a detent allows a reproducible force to be required for moving the release button.

It follows that, in the case of a force acting on the actuation button, the button locking mechanism may be configured as a unilateral locking mechanism, and in the case of a force acting on the release button it may be configured as a unilateral detent. In the case of this configuration, the directions of action of the locking mechanism and of the detent are opposite to each other.

One of the positive locking elements of the button locking mechanism may e.g. be pin-shaped, a drive-in pin, by way of example, and the other positive locking element may be a recess on a protrusion, in which the drive-in pin is accommodated in the secured condition of the underwater hook.

The actuation button may be in engagement with the jaw latch via a jaw locking mechanism and block the jaw latch in the position closing the hook jaw, in particular when the actuation button occupies the closed position. The jaw locking mechanism may be arranged in spaced relationship with the gear unit. The jaw locking mechanism is preferably a unilaterally acting directional locking mechanism that can only be released by a movement of the actuation button away from the closed position. The jaw locking mechanism can preferably not be released by a movement of the jaw latch.

The actuation button and the jaw latch may be configured as two interlocking pawls, in particular in addition to their configuring as toothed levers. In the closed position of the actuation button, the actuation button and the jaw latch are supported against each other on the jaw locking mechanism, when a force acts on the jaw latch in the opening direction thereof.

The jaw locking mechanism is preferably configured such that a force acting on the closed and locked jaw latch in the opening direction thereof is transmitted via the jaw locking mechanism to the actuation button and is directed at the actuation button through the pivot axle of the latter. It follows that the actuation button remains momentum-free even with high forces acting on the jaw latch. The force required for actuating the actuation button will thus remain largely unaffected by the force acting on the jaw latch. In addition, also the release button will thus remain momentum-free, so that the force required for actuating the same will remain independent of the load on the jaw latch.

According to a further advantageous embodiment, the motion-transmitting connection between the actuation button and the jaw latch has an amount of play corresponding at least to the stroke of the actuation button from the safety position to the release position. Throughout this stroke, there is a lost motion in the motion transmission, so that a movement of the actuation button will initially not lead to a movement of the jaw latch. The lost motion serves to allow the jaw locking mechanism to be released by a movement of the actuation button, without this movement resulting in a movement of the jaw latch.

The jaw latch may be pretensioned, e.g. by a jaw spring, towards the position in which it closes the hook jaw. The jaw spring, e.g. a leg spring placed around the pivot axle of the jaw latch, which is supported on the jaw latch and on the main body, can pretension the gear unit arranged between the jaw latch and the actuation button, so that, in spite of an amount of play in the gear unit, the motion-transmitting elements, such as teeth, will always be in contact with one another.

According to a further advantageous embodiment, the main body may have at least one opening, which extends from outside the main body towards the release button. This at least one opening may serve as a flushing opening for flushing the area between the release button and the main body. According to a further embodiment, it may also be used for fixing the release button in the actuation position by means of a fastener, e.g. a drive-in pin, a rivet or a screw. In this embodiment, the release button is ineffective and the open condition of the underwater hook is achieved solely by actuating the actuation button. The opening may, in particular, extend transversely to the direction of movement of the release button. The opening may extend through the entire main body and the release button, when the release button occupies the actuation position.

The actuation button may have an attachment point for attaching a pulling means, e.g. a lanyard. The attachment point may be a simple hole or a stepped hole. The pulling means may be attached to the attachment point. The use of a pulling means will be particularly advantageous in cases where the release button is fixed in the actuation position, so that the underwater hook can only be transferred to the open condition by pulling the pulling means.

For this purpose, the actuation position is preferably located at an end of the actuation button facing away from the pivot axle of the actuation button. The pulling means may extend away from the underwater hook on the side of the release button.

The underwater hook may be configured for various load-bearing capacities, e.g. 5 t, 10 t, 25 t or larger, smaller and intermediate values. It will be particularly advantageous when, in a set 80 (see FIG. 12) comprising at least two underwater hooks with different load-bearing capacities, the main bodies of the underwater hooks with different load-bearing capacities have the same, in particular at least sectionwise circular, outer contour in the area in which the main body covers the actuation button and the release button. The length of this area may be the same in the case of the underwater hooks of different load-bearing capacities. This makes it possible to always handle the underwater hooks in the same way, in spite of their different load-bearing capacities, which will make handling substantially easier, especially in underwater use with a remote-controlled gripper.

At least one underwater hook of the set 80 may have a main body having, in the area in which it covers the release button and the actuation button, at least one longitudinal rib extending in the longitudinal direction of the underwater hook. The longitudinal ribs of underwater hooks of different load-bearing capacities may have different sizes, so as to provide the respective required stress cross-section. An underwater hook may also have a solid cross-section without any longitudinal ribs.

The longitudinal direction is the direction in which the underwater hook is intended to have a load applied thereto, i.e. the direction from the attachment portion to the hook portion.

In the following, the present invention will be described exemplarily making reference to two embodiments. According to the above embodiments, a feature can be dispensed with, if the advantage or technical effect associated with that feature is not important in a particular case of use. Conversely, a feature may also be added in accordance with the above embodiments, if the advantage or technical effect of that feature is of advantage in a particular case of use.

In the figures, like reference numerals are used for elements that correspond to one another with respect to structure and/or function.

Figure 2:
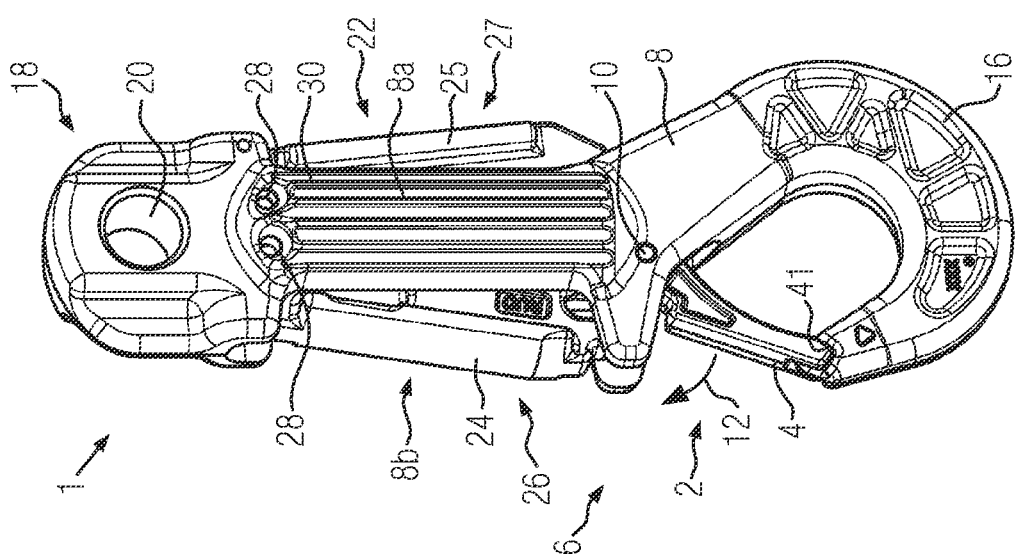
Figure 3:
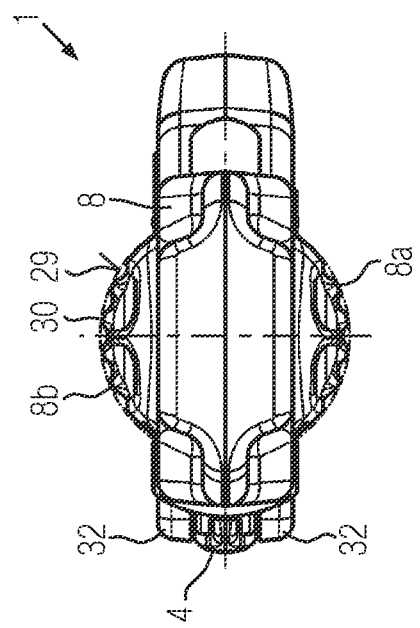
Figure 4:
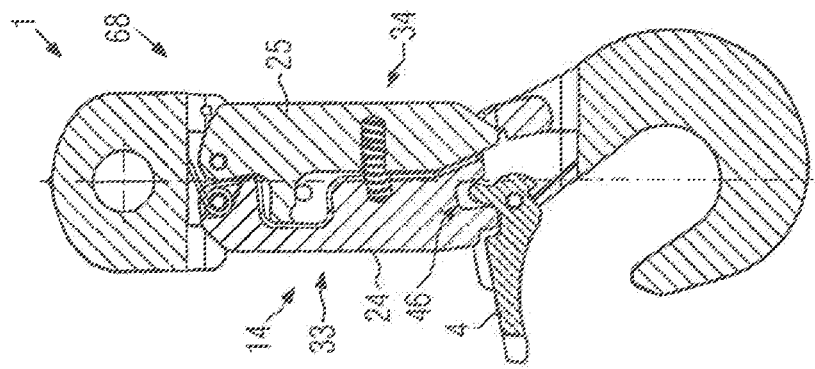
Figure 5:
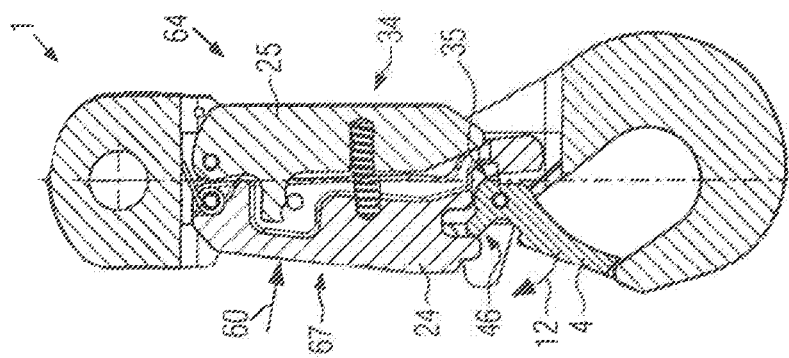
Figure 6:
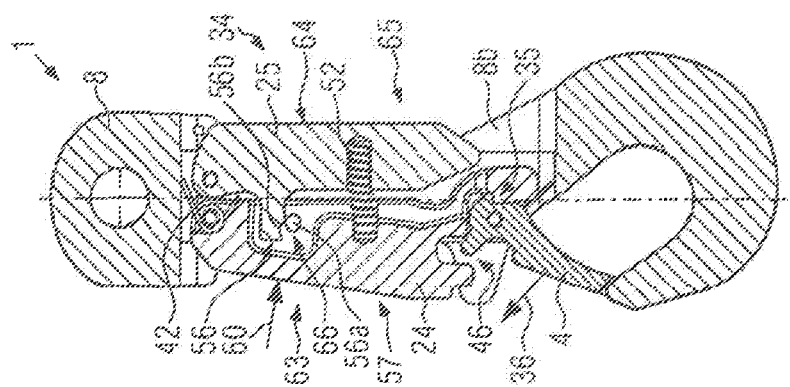
Figure 7:
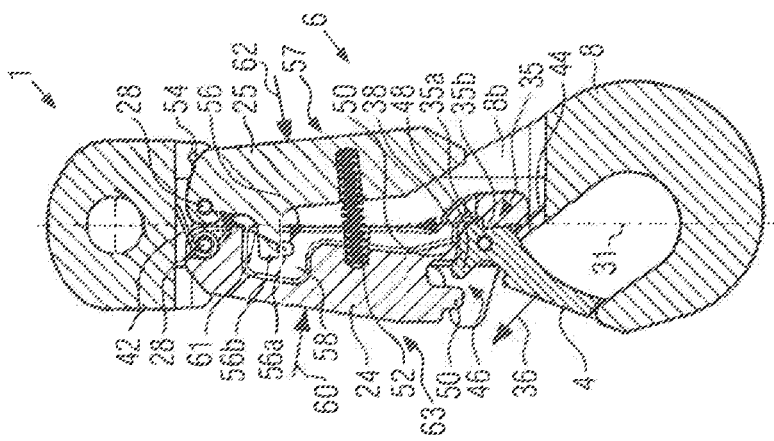

The figures show:

FIG. 1 a schematic perspective view of a closed underwater hook;

FIG. 2 a schematic perspective view of an open underwater hook;

FIG. 3 a schematic top view of a closed underwater hook;

FIG. 4 a schematic sectional view of the underwater hook according to FIG. 1 in a secured condition;

FIG. 5 a schematic sectional view of the underwater hook according to FIG. 3 in an unlocked condition;

FIG. 6 a schematic sectional view of the underwater hook according to FIG. 3 in an unlocked condition;

FIG. 7 a schematic sectional view of the underwater hook according to FIG. 3 in the open condition;

FIG. 8 a perspective view of a further underwater hook;

FIG. 9 a schematic sectional view of the underwater hook according to FIG. 7 in the secured condition;

FIG. 10 a schematic sectional view of the underwater hook according to FIG. 8 in the unlocked condition;

FIG. 11 a schematic sectional view of the underwater hook according to FIG. 8 in the open condition.

Figure 12:
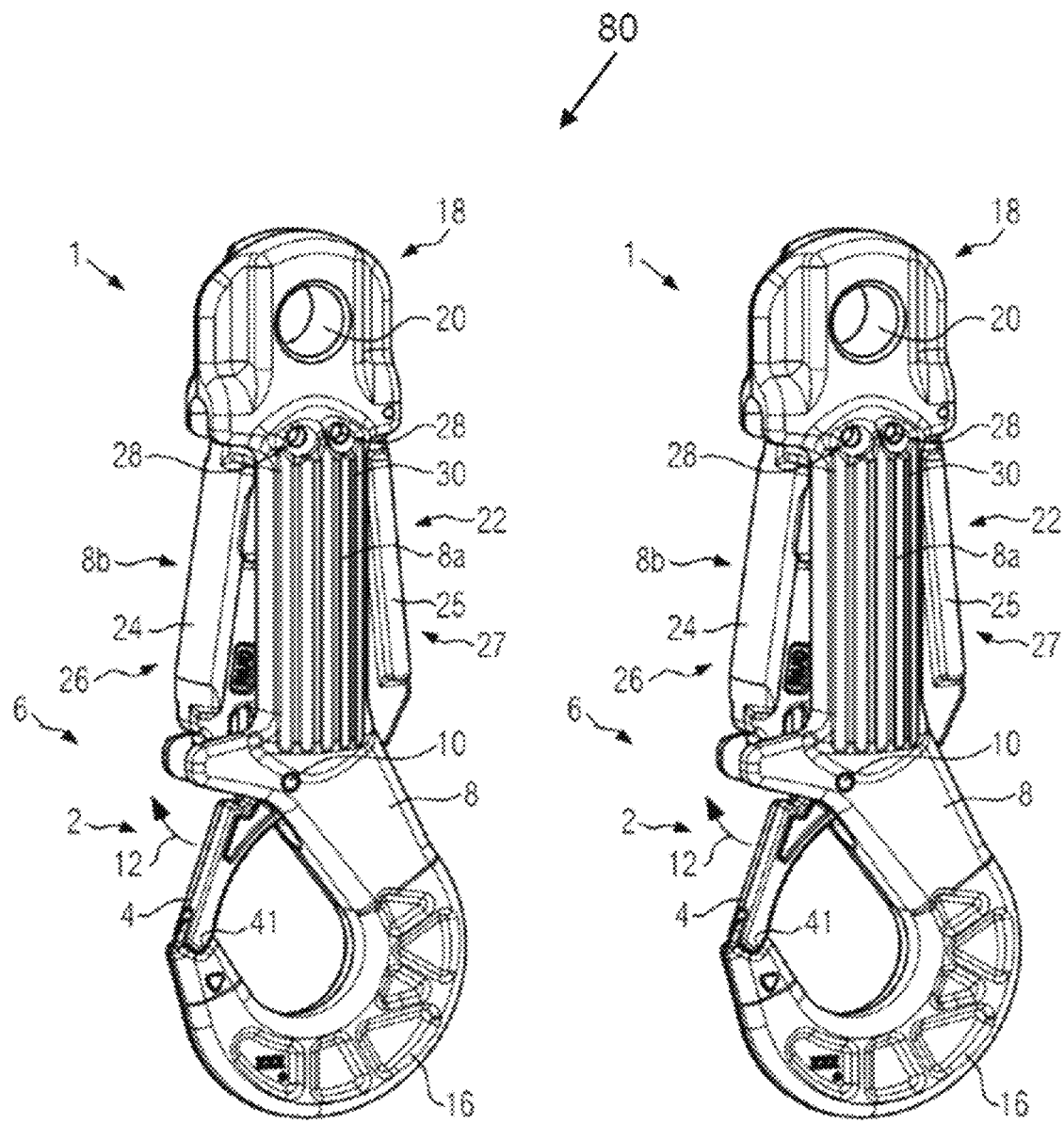

FIG. 12 a schematic perspective view of a set of underwater hooks.

First, the structural design of an underwater hook 1 will be explained in general, making reference to FIGS. 1 to 3.

The underwater hook 1 has a hook jaw 2 into which a load (not shown) can be hooked-in making use of attachment means, such as a chain or a rope. The hook jaw 2 is provided with a pivotable jaw latch 4, which closes the hook jaw 2 in a secured condition 6 of the underwater hook 1 and is secured in this position. The secured condition 6 is shown in FIG. 1.

The jaw latch 4 is supported on a main body 8 so as to be pivotable about a latch axle 10 that may be formed by a drive-in pin, by way of example. In an open condition 14 of the underwater hook 1, the jaw latch 4 is open, as shown in FIG. 2. The opening direction 12 may here be directed away from a hook portion 16 of the main body, the hook portion 16 being curved around the hook jaw 2.

For attaching the underwater hook 1 to e.g. a lifting device, an attachment element 18, e.g. an eye 20, is provided.

The hook portion 16 and the attachment element 20 have provided between them an actuation portion 22 comprising an actuation button 24 movable relative to the main body 8, and a release button 25 movable relative to the main body 8. The actuation button 24 opens the jaw latch 4. The release button 25 locks the actuation button 24 in the secured condition 6.

In the secured condition 6 of the underwater hook 1, the actuation button 24 occupies a closed position 26. The release button 25 occupies a locking position 27.

The actuation button 24 and the release button 25 may be supported pivotably on the main body 8, e.g. via drive-in pins forming pivot axles 28. The pivot axle 28 of the actuation button 24 is here preferably located on the side of the attachment element 18 and at the end of the actuation button 24 and of the actuation portion 22, respectively, facing away from the hook portion 16. Also the pivot axle 28 of the release button 25 is located preferably at the end of the release button 25 facing away from the hook portion 16.

Alternatively or additionally to a pivotable arrangement, the actuation button 24 and the release button 25 may also be supported displaceably in the main body 8.

In the area of the actuation portion 22, the main body 8 is divided so that it forms two jaw-shaped housing halves 8a, 8b. The housing halves 8a, 8b are preferably identically configured in mirror image. The actuation button 24 and the release button 25 extend at least partially to a location between the two housing halves 8a, 8b. The cross-section of the two housing halves 8a, 8b transverse to the direction from the attachment element 18 to the hook portion 16 has an, at least sectionwise circular, outer contour or envelope 29, as can be seen in particular in FIG. 3.

Differently sized underwater hooks or underwater hooks of different load-bearing capacities have actuation portions 22 with preferably identical outer contours 29, so as to ensure the same handling characteristics throughout different underwater hooks. In the case of underwater hooks of lower load-bearing capacities, the housing halves 8a, 8b may have longitudinal ribs 30 extending along a longitudinal direction 31 of the underwater hook 1 between the attachment element 18 and the hook portion 16. In the case of underwater hooks of higher load-bearing capacities, the housing halves 8a, 8b may be made of solid material so as to provide a larger stress cross-section. Alternatively, longitudinal ribs may also be provided in this case.

The two housing halves 8a, 8b may form a pair of e.g. protruding protective jaws 32 having the jaw latch 4 pivoted therebetween in the open condition 14. In the secured condition 6, one of the buttons, e.g. the actuation button 24, may be located between the protective jaws 32.

In the open condition 14 of the underwater hook 1, the actuation button 24 occupies an open position 33 and the release button 25 occupies an actuation position 34. In the open position 33, the actuation button 24 has been moved towards the release button 25 and pushed into the main body 8. In the actuation position 34, the release button 25 has been moved towards the actuation button 24 and pushed into the main body 8.

FIG. 4 shows the secured condition 6 of the underwater hook 1 in a sectional view, so as to make the function and the structural design of the buttons 24, 25 more easily understandable.

In the secured condition 6, the actuation button 24 locks the jaw latch 4 in a position closing the hook jaw 2, so that the jaw latch 4 cannot be opened inadvertently by a load (not shown) hooked in the underwater hook 1.

In the secured condition 6 and in the closed position 26, respectively, the actuation button 24, which is connected to the jaw latch 4 in a motion-transmitting manner, is blocked by the release button 25 occupying the locking position 27. It follows that, in the secured condition 6, the actuation button 24 cannot be pushed-in. Only when the release button 25 is pushed-in and moved away from the locking position 27 or occupies the actuation position 34 can the actuation button 24 be pushed-in or moved from the closed position 26 to the open position 33 and thus open the jaw latch 4 coupled thereto in a motion-transmitting manner. In the force-free condition, the actuation button 24 and the release button 25 assume the secured condition 6.

Only when the release button 25 occupies the locking position 27 can the underwater hook assume the secured condition 6. The release button 25 is therefore a visual indicator for the secured condition. In an area that is only visible when the release button is in the locking position 27, the release button 25 may be provided with a marking, for example a color, that is quickly visually recognizable, in particular under water, so as to identify the secured condition 6 of the underwater hook.

The jaw latch 4 and the actuation button 24 are in direct engagement with each other via a jaw locking mechanism 35. The jaw locking mechanism 35 blocks an opening movement of the jaw latch 4 in the event of an opening force 36 acting on the jaw latch 4 in the opening direction 12. The jaw locking mechanism 35 acts unilaterally in that it does not block the movement of the actuation button 25 in the direction of the open position 33. The jaw locking mechanism 35 may comprise two positive locking elements 35a, 35b, e.g. a projection on the jaw latch side and a projection on the actuation button side, which are pressed against each other under the effect of the opening force 36.

The opening force 36 is transmitted to the actuation button 24 by the jaw locking mechanism 35. The jaw locking mechanism 35 and the positive locking elements 35a, 35b, respectively, are configured such that the holding force 38 acting there and generated by the opening force 36 is directed through the pivot axle 28 of the actuation button 24. As a result, the actuation button 24 and the release button 25 remain momentum-free and can be operated by a force that is independent of the magnitude of the opening force. The opening force is not able to open the jaw latch 4. A latch stop 41 on the hook portion 16 (FIG. 1), against which the jaw latch 4 rests in the closed condition 6, prevents the jaw latch 4 from being openable by a force acting from outside and directed in a direction opposite to the opening force 36.

In the force-free condition, the actuation button 24 is pushed, by means of a closing spring 42, away from the main body 8 and the housing halves 8a, 8b, respectively, and/or from the open position 33 into the closed position 26. The closing spring 42 is preferably supported directly between the actuation button 24 and the main body 8. It may, for example, be configured as a leg spring, which is placed around the pivot axle 28 of the actuation button 24, one leg resting on the main body 8 and another leg resting on the actuation button 24.

An optional jaw spring 44, e.g. a leg spring, acts on the jaw latch 4 in the direction of the position at which the latter closes the hook jaw 2. The jaw spring 44 may be part of the spring system and may be supported between the main body 8 and the jaw latch 4.

The actuation button 24 is coupled to the jaw latch 4 in a motion-transmitting manner, e.g. via a gear unit 46. In this way, the actuation button 24 and the jaw latch 4 can be intermeshed. For example, teeth 48 of the jaw latch 4 may engage between teeth 50 of the actuation button 24. The jaw latch 4 and the actuation button 24 form two opposed toothed levers in this case.

The release button 25 is acted upon by a locking spring 52, which pushes it away from the housing 8 and in the direction of the locking position 27. It follows that, in the force-free condition, both the release button 25 and the actuation button 24 strive for the secured condition 6 of the underwater hook 1. Preferably, the locking spring 52 is supported directly between the actuation button 24 and the release button 25. The locking spring 52 forces the actuation button 24 and the release button 25 away from each other.

In the force-free condition, the release button 25 rests against a release button stop 54. The release button stop 54 limits the movement of the release button 25 away from the main body 8. The locking spring 52 defines together with the closing spring 42 a spring system, which ensures that the actuation button 24 and the release button 25 assume, when at rest, the secured condition 6 and their respective closed position 57.

The actuation button 24 and the release button 25 are in engagement with each other via a button locking mechanism 56. The button locking mechanism 56 blocks a movement or a pushing-in of the actuation button 24 away from the secured condition 6, in which the jaw latch 4 is blocked. An actuation or a pushing-in of the release button 25 is not blocked by the button locking mechanism 56.

The button locking mechanism 56 has two positive locking elements 56a, 56b resting against each other in the force-free condition of the underwater hook 1, in particular under the effect of the locking spring 52. One positive locking element 56b may, for example, define a protrusion on the actuation button 24 or on the release button 25, the protrusion extending into a pocket 58 of the respective other button. Also the other positive locking element 56a may be a protrusion or some other element, such as a pin or a bolt.

When an actuating force 60 acts on the actuation button 24 so as to push it towards the main body 8, the locking force 61 generated at the button locking mechanism 56 by the actuating force 60 is directed preferably through the pivot axle 28 of the release button 25. The release button 25 thus remains momentum-free and comparatively easy to actuate, even if high actuating forces act on the actuation button 24. Alternatively, the locking force 61 may also be directed such that an effect pushing the actuation button 25 away from the main body 8 into the secured condition 6, for example a moment of force and/or a torque, is generated by the button locking mechanism 56 and acts on the release button 25. The button locking mechanism 56 is self-locking with respect to the actuating force 60 and can only be released by an unlocking force 62 acting on the release button 25. The unlocking force 62 is here opposed to the actuating force 60. Opposing forces 60, 62 can be applied, for example, in the case of a pincer grip of the type generated by a gripper.

The locking spring 52 preferably has a lower spring hardness than the closing spring 42, so that, when the actuation button 24 and the release button 25 are actuated simultaneously, only the release button 25 will be moved initially and the button locking mechanism 56 will be unlocked.

The closed position 26 of the actuation button 24, in which the jaw latch 4 remains closed, comprises at least two further positions, which directly result from the above description. As long as the jaw locking mechanism and the button locking mechanism 56 are in engagement and block a movement of the jaw latch 4 and of the actuation button 24, the actuation button 24 occupies the safety position 63 shown in FIG. 4. When the release button 25 is moved from the locking position 27 (FIG. 1, 4) to the actuation position 34 (FIG. 2), the button locking mechanism 56 is brought out of engagement and the actuation button 24 can be moved in the direction of the open position 33.

In FIG. 5, the release button 25 occupies the actuation position 34. The button locking mechanism 56 is in the released condition. The actuation button 24 has not yet been moved away from the safety position 63. The jaw locking mechanism 35 is therefore still in engagement. The underwater hook 1 is in an unlocked condition 65, in which the actuation button 24 can be actuated and the jaw latch 4 is still secured.

As can additionally be seen in FIG. 5, the button locking mechanism 56 may include an, in particular unilateral, detent or limit-value locking mechanism 66, in the form of an interlock, for example, in that one positive locking element 56a lockingly engages the other positive locking element 56b under the effect of the spring system, formed by the closing spring 42 and the locking spring 52, in the secured condition 6 of the underwater hook 1. This provides further protection, since the detent 66 must first be overcome so as to allow a movement of the release button 25 from the locking position 27. The detent 66 also allows to set the resistance, which must be overcome for moving the release button 25 away from the locking position 27, within narrow-tolerance predetermined limits.

In the unlocked condition 65 of the underwater hook 1, only the release button 25 is moved away from its position of rest under the effect of the forces 60, 62, even in the case of a pincer grip, due to the weaker locking spring 52. The actuation button 24 still occupies the position of rest and the closed position. Hence, although the movement of the release button 25 is unblocked, a movement of the hook jaw 2 is still blocked by the engaged jaw locking mechanism 35. It follows that a force 36 acting on the jaw latch 4 can therefore still not inadvertently open the hook jaw 2.

Only when the actuating force 60 is increased will the actuation button 24 move towards the main body 8 and the open position 33 and the jaw locking mechanism 35 will be released. This is shown in FIG. 6.

The jaw latch 4 is unlocked but still closed. The actuation button 24 occupies a release position 67. The release position 67 is part of the closed position 26, since the jaw latch 4 is still closed. The release button 25 occupies the actuation position 34. The underwater hook 1 is in an unlocked condition 68.

The stroke of the actuation button 24 required for releasing the jaw locking mechanism 35 is at most as large as an amount of play of the gear unit 46, so that the gear unit 46 will only engage in a motion-transmitting manner and establish a motion coupling between the actuation button 24 and the jaw latch 4 when the jaw locking mechanism 35 has been released.

Under the effect of the actuating force 60, the further movement of the actuation button 24 is now transmitted via the gear unit 46 to the jaw latch 4, so that the latter will move in the opening direction 12 until the fully open condition 14 of the underwater hook 1, shown in FIG. 7, has been reached. In the fully open condition 14, the actuation button 24 and the release button 25 are fully pushed-in and the jaw latch 4 is fully open. The actuation button 24 occupies the open position 33. The release button 25 occupies the actuation position 34.

Preferably, between the unlocked and the open condition, the gear unit 46 is engaged in a play-free or almost play-free manner, but in any case has considerably less play than in the secured condition 6. If the buttons 24, 25 are now released again, the buttons 24, 25 are forced apart into their closed positions under the effect of the spring system defined by the closing spring 42 and the locking spring 52. The actuation button 24 drives here the jaw latch 4 in a direction opposite to the opening direction 12 via the gear unit 46. The jaw locking mechanism 35 and the button locking mechanism 56 are of the automatically locking type. The underwater hook 1 automatically assumes the secured condition 6 when no forces act on it from outside.

The underwater hook 1 shown in FIG. 8 will be described in more detail hereinafter, only the differences existing with respect to the underwater hook 1 according to FIGS. 1 to 7 being here discussed.

The underwater hook 1 according to FIG. 8 is configured to be provided with a pulling means 70, e.g. a so-called lanyard. In order to transfer the underwater hook 1 into the open condition 14, it will suffice to pull the pulling means 70 or to push the actuation button 24.

A release button 25 is provided, but fixed in the actuation position 34, in which the button locking mechanism is released. The release button 25 may be held in the pushed-in position in a form-fit manner. For this purpose, for example, a fastener 72, such as a drive-in pin, may extend through the main body 8 and the actuation button 24. Also other fixing modes, such as soldering, welding, screwing or riveting are possible. An opening 74 that receives the fastener therein may serve as a flushing opening when the underwater hook 1 is used without a pulling means and the release button 25 is not fixed. The opening extends perpendicular to the direction of movement of the actuation button 24 and/or the release button 25. It may extend from outside the underwater hook 1 up to the release button 25 and through the latter and/or through the entire underwater hook 1. The opening 74 may also be provided in the embodiment according to FIG. 1 or 4.

As can be seen in FIG. 9, the actuation button 24 has an attachment point 76 for the pulling means 70. This attachment point 76 may be configured e.g. in the form of a reception means into which the pulling means 70 is hooked. Preferably, the attachment point 76 is located at an end facing away from the pivot axle 28 of the actuation button 24. Since the button locking mechanism 56 is always released due to the pushed-in fixed release button 25, the actuation button 24 can be pulled towards the main body 8 by a pulling force 78 acting on the pulling means 70 and the attachment point 76, respectively. As can be seen from FIG. 10, the jaw locking mechanism 35 will here first be released before the gear unit 46 enters into engagement and transmits the movement of the actuation button 24 to the jaw latch 4. Subsequently, due to the further actuation of the actuation button 24, the jaw latch 4 will open until the fully open condition 14 shown in FIG. 11 has been reached.

REFERENCE NUMERALS 1 underwater hook
2 hook jaw
4 jaw latch
6 secured condition of the underwater hook
8 main body
8a, 8b housing half
10 latch axle
12 opening direction
14 open condition of the underwater hook
16 hook portion
18 attachment element
20 eye
22 actuation portion
24 actuation button
25 release button
26 closed position of the actuation button
27 locked position of the release button
28 pivot axle of a button
29 outer contour
30 longitudinal rib
31 longitudinal direction
32 protective jaw
33 open position of the actuation button
34 actuation position of the release button
35 jaw locking mechanism
35a, 35b positive locking element
36 opening force
38 holding force
41 latch stop
42 closing spring
44 jaw spring
416 gear unit
48 teeth
50 teeth
52 locking spring
54 release button stop
56 button locking mechanism
56a, 56b positive locking element
57 closed position
58 pocket
60 actuating force
61 locking force
62 unlocking force
63 safety position of the actuation button
65 unlocked condition
66 limit-value locking mechanism
67 release position of the actuation button
68 unlocked condition
70 pulling means
72 fastener
74 opening
76 attachment point for the pulling means
78 pulling force
80 set of underwater hooks.

The invention claimed is:

1. An underwater hook (1) comprising a jaw latch (4) which, in a secured condition (6) of the underwater hook, is releasably secured in a position closing a hook jaw (2), an actuation button (24) which, for opening the jaw latch, is connected to the jaw latch in a motion-transmitting manner and is in a closed position (26, 63) in the secured condition of the underwater hook, and a release button (25) blocking a movement of the actuation button out of the closed position in the secured condition of the underwater hook, wherein the release button (25) is in engagement with the actuation button (24) in the secured condition (6) of the underwater hook (1), wherein the underwater hook comprises a main body (8), in which the actuation button (24) is movably received, and wherein a closing spring (42) is provided, which acts on the actuation button and which is supported between the main body and the actuation button and presses the actuation button towards the secured condition (6), and wherein the release button (25) is supported on the actuation button (24) via a locking spring (52).

2. The underwater hook (1) according to claim 1, wherein the locking spring (52) has a lower spring hardness than the closing spring (42).

3. The underwater hook (1) according to claim 1, wherein, in the secured condition (6), the release button (25) is in engagement with the actuation button (24) via a button locking mechanism (56) and locks the actuation button (24) in the closed position (26, 63).

4. The underwater hook (1) according to claim 3, wherein the button locking mechanism (56) is located between the actuation button (24) and the release button (25).

5. The underwater hook (1) according to claim 3, wherein the button locking mechanism (56) comprises two positive locking elements (56a, 56b) that are locked to each other in the secured condition of the underwater hook (1).

6. The underwater hook (1) according to claim 5, wherein a positive locking element (56b) is disposed on the actuation button (24) such that the positive locking element (56b) projects into a pocket (58) of the release button (25) or disposed on the release button such that the positive locking element (56b) projects into a pocket of the actuation button.

7. The underwater hook (1) according to claim 1 wherein the actuation button (24) is in engagement with the jaw latch (4) via a jaw locking mechanism (35) and blocks the jaw latch in the position closing the hook jaw (2).

8. The underwater hook (1) according to claim 7, wherein, additionally, the actuation button (24) is in engagement with the jaw latch (4) via a gear unit (46) spaced apart from the jaw locking mechanism (35).

9. The underwater hook (1) according to claim 1, wherein the actuation button (24) and the release button (25) are accommodated in a main body (8), in which an opening (74) extending from outside the main body up to the release button is formed.

10. The underwater hook (1) according to claim 2, wherein, in the secured condition (6), the release button (25) is in engagement with the actuation button (24) via a button locking mechanism (56) and locks the actuation button (24) in the closed position (26, 63).

11. The underwater hook (1) according to claim 10, wherein a positive locking element (56b) is disposed on the actuation button (24) such that the positive locking element (56b) projects into a pocket (58) of the release button (25) or disposed on the release button such that the positive locking element (56b) projects into a pocket of the actuation button.

12. The underwater hook (1) according to claim 11, wherein the actuation button (24) is in engagement with the jaw latch (4) via a jaw locking mechanism (35) and blocks the jaw latch in the position closing the hook jaw (2).

13. The underwater hook (1) according to claim 12, wherein, additionally, the actuation button (24) is in engagement with the jaw latch (4) via a gear unit (46) spaced apart from the jaw locking mechanism (35).

14. The underwater hook (1) according to claim 13, wherein, in a safety position (63), the actuation button (24) blocks the jaw latch (4) in a position closing the hook jaw (2), that, in a release position (67) spaced apart from the safety position (63), the jaw latch (4) is closed and movable with the actuation button (24), and that, in an open position (33) of the actuation button (24) spaced apart from the release position, the jaw latch (4) is open, that the release position is located between the safety position and the open position, and that, in the open position and in the release position of the actuation button, the release button (25) is moved away from a locking position (27) in which the underwater hook (1) is in the secured condition (6).

15. The underwater hook (1) according to claim 1, wherein, in a safety position (63), the actuation button (24) blocks the jaw latch (4) in a position closing the hook jaw (2), that, in a release position (67) spaced apart from the safety position (63), the jaw latch (4) is closed and movable with the actuation button (24), and that, in an open position (33) of the actuation button (24) spaced apart from the release position, the jaw latch (4) is open, that the release position is located between the safety position and the open position, and that, in the open position and in the release position of the actuation button, the release button (25) is moved away from a locking position (27) in which the underwater hook (1) is in the secured condition (6).

16. An underwater hook (1) comprising a jaw latch (4) which, in a secured condition (6) of the underwater hook, is releasably secured in a position closing a hook jaw (2), an actuation button (24) which, for opening the jaw latch, is connected to the jaw latch in a motion-transmitting manner and is in a closed position (26, 63) in the secured condition of the underwater hook, and a release button (25) blocking a movement of the actuation button out of the closed position in the secured condition of the underwater hook, wherein the release button (25) is in engagement with the actuation button (24) in the secured condition (6) of the underwater hook (1), wherein the actuation button (24) is provided with an attachment point (76) for attaching a pulling means (70), and wherein the release button (25) is fixed in an actuation position (34), in which the actuation button (24) is movable away from the closed position (26, 63).

17. A set comprising at least two underwater hooks (1) having different load-bearing capacities, wherein each underwater hook of the set comprises a jaw latch (4) which, in a secured condition (6) of the underwater hook, is releasably secured in a position closing a hook jaw (2), an actuation button (24) which, for opening the jaw latch, is connected to the jaw latch in a motion-transmitting manner and is in a closed position (26, 63) in the secured condition of the underwater hook, and a release button (25) blocking a movement of the actuation button out of the closed position in the secured condition of the underwater hook, wherein the release button (25) is in engagement with the actuation button (24) in the secured condition (6) of the underwater hook (1), and wherein each underwater hook of the set comprises a housing in which the buttons are accommodated, the housings of the underwater hooks of the set being of equal cubage.

18. The set according to claim 17, wherein each underwater hook comprises a main body (8), in which the actuation button (24) is movably received, and wherein a closing spring (42) is provided, which acts on the actuation button and which is supported between the main body and the actuation button and presses the actuation button towards the secured condition (6).

19. The set according to claim 18, wherein the release button (25) is supported on the actuation button (24) via a locking spring (52).

20. The set according to claim 19, wherein the locking spring (52) has a lower spring hardness than the closing spring (42).

* * * * *